UNITED STATES PATENT OFFICE.

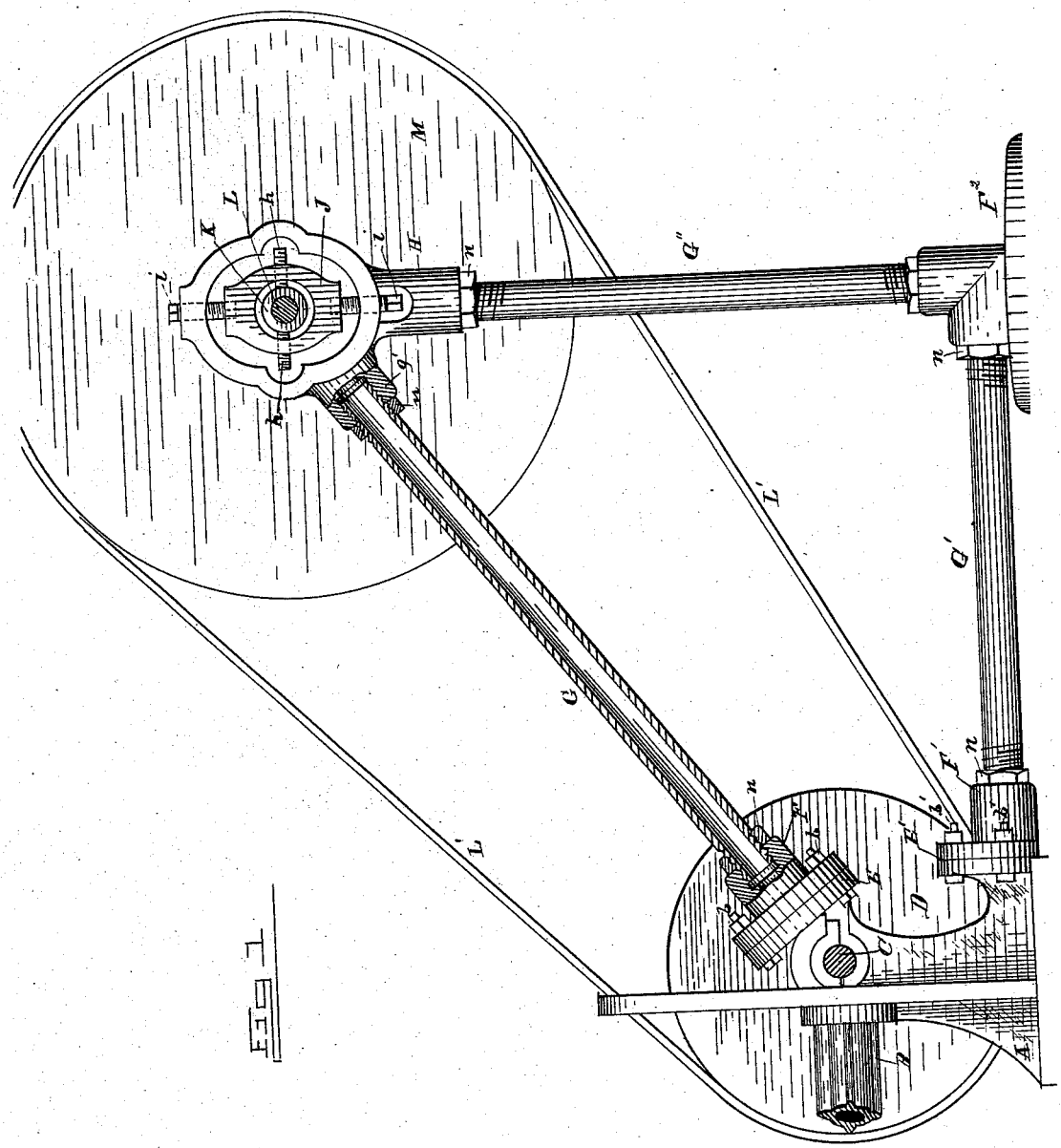
(No Model.)
V. W. BLANCHARD.
ENGINE AND SHAFTING BED.
No. 413,895.
Patented Oct. 29, 1889.
2 Sheets—Sheet 1.

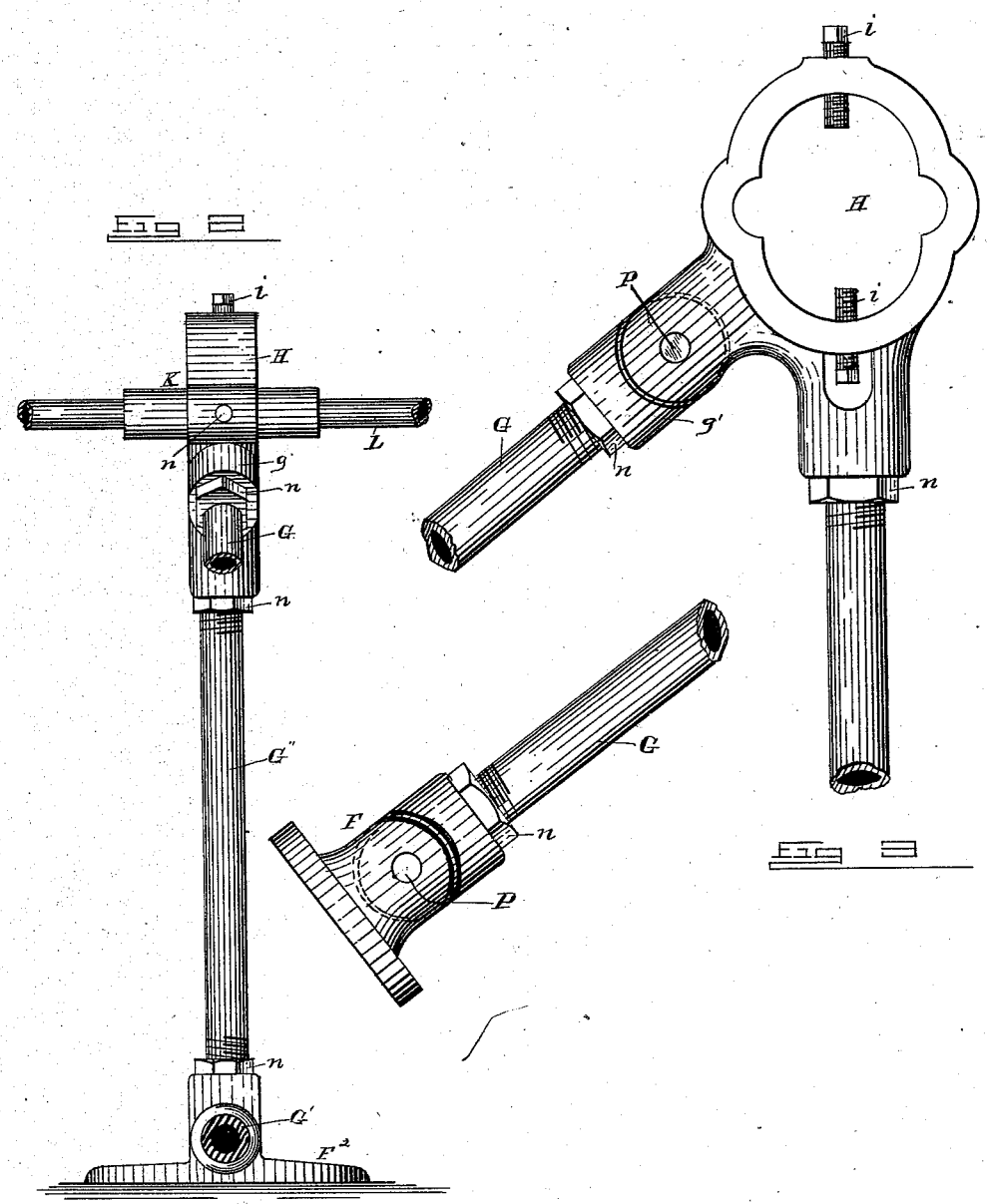

VIRGIL W. BLANCHARD, OF NEW YORK, N. Y., ASSIGNOR TO JOSEPH A. DAVIS, OF SAME PLACE.

ENGINE AND SHAFTING BED.

SPECIFICATION forming part of Letters Patent No. 413,895, dated October 29, 1889.

Application filed March 29, 1889. Serial No. 305,297. (No model.)

*To all whom it may concern:*

Be it known that I, VIRGIL W. BLANCHARD, of New York, in the county of New York and State of New York, have invented certain new and useful Improvements in Engine and Shafting Beds; and I do hereby declare that the following is a full, clear, and exact description thereof, reference being had to the accompanying drawings, and to the letters of reference marked thereon, which form part of this specification, in which—

Figure 1 is a side elevation, partly in section, of one end of an engine-bed having my improvement applied to it. Fig. 2 is an end elevation of the shaft-supporting frame, partly in section. Fig. 3 is a detail view illustrating a modification of the frame.

The object of this invention is to avoid the necessity of bolting an engine-bed to the floor of a building when the engine is used for driving line-shafting by belting, and to obviate the great vibration consequent upon thus transmitting power and motion; and it consists in an auxiliary supporting-frame which affords a bearing for a line-shaft and which is rigidly secured to the engine-bed, and also supported on the floor independently of the said bed, as will be fully understood from the following description when taken in connection with the annexed drawings.

A designates one of the standards of an engine-bed, which standards are rigidly secured together by strong ties B.

C represents the main crank-shaft of the engine, on which is a fly or balance wheel D, that also serves as a belt-wheel for transmitting rotary motion to an overhead or line shaft L by means of a belt L'.

G G' G'' designate three "gas-pipe" sections, which constitute the main portions of my triangular frame. These sections are rigidly united as follows:

E E' designate circular heads, which are cast solid with the standard A of the engine-bed in about the vertical plane of the journal-bearing of shaft C, nearest the balance-wheel D. To the upper head E is rigidly secured by bolts b a flanged ferrule F, into the socket of which is screwed one end of the inclined section G. The opposite end of this section is screwed into a nipple g' of an open head H, in which a gimbal J has its bearings.

F' designates a flanged ferrule, which is secured to standard A near its base by bolts b'; and into which is screwed one end of the horizontal section G' of the rectangular frame, the opposite end of which section is screwed into an L-coupling F², which has a broad base F³ for substantially sustaining the outer portion of the frame upon a floor or other convenient foundation.

G'' designates the vertical section of the frame, one end of which is screwed into the coupling F² and the other end into the nipple of the open head H. I employ right and left screw-threads on the ends of each one of the frame-sections, and also use jam-nuts n for making rigid connections.

The gimbal J is held in place in the open head H by screw-pivots i i above and below, which allow the gimbal, and consequently the shaft L, to be adjusted vertically. In this gimbal J is a journal-box K, which affords a bearing for the line-shaft L, on which is keyed the belt-wheel M, that receives rotation from the balance-wheel D. The journal-box K is sustained in the eye of the gimbal by means of screw-pivots h h, which allow the line-shaft L to be adjusted horizontally. A proper alignment can be given shaft L by means of the adjusting-screws h h i i, and as these screws are pivots for the gimbal and journal-box there will be no liability of the shaft binding in its box. The bearing for the line-shaft L nearest belt-wheel M is sustained by an auxiliary frame which is rigidly secured to the engine-bed. Consequently the tension on the driving-belt and the force necessary to drive the shaft L will not cause the engine-bed to tremble. I am thus able to employ a comparatively-light engine-bed and to avoid the necessity of bolting or otherwise anchoring it to its floor or foundation.

In practice the nipples of ferrules F g' are preferably connected by means of pivots P P, as in Fig. 3, for the purpose of properly adjusting the angle of inclination of the triangular frame according to the height required for the shaft L. I do not, however, confine myself to the use of these joints.

Having thus described my invention, I claim—

1. The combination, with an engine-bed and a belt-wheel on the main or crank shaft of an engine, of a frame which is rigidly secured to said bed and provided with a head in which is adjustably mounted a journal-box for the journal of a line-shaft, substantially as described.

2. The combination of an engine-bed with an angular frame, an adjustable head thereon, and an adjustable gimbal mounted in said head and carrying an adjustable journal-box for a line-shaft, substantially as described.

3. The combination of an open head H, a vertically and horizontally adjustable journal-box, a line-shaft bearing a belt-wheel, and a frame supporting the same secured rigidly to an engine-bed bearing a crank-shaft, and a belt-wheel on this shaft, substantially as described.

4. A supporting-frame for a line-shaft, consisting of the sections G G' G'', secured by means of right and left screw-threads into an open head H, to a base-coupling $F^2$, and to ferrules which are bolted to an engine-bed, substantially as described.

5. In combination with an engine-bed, a triangular support for a line-shaft secured to said bed and having the section G, connected by pivots P to the parts F H, substantially as described.

6. In an engine-bed and shaft-support, the combination of the bed A, having circular heads E E', and the head H, with the sections G G' G'' and ferrule F, all substantially as specified.

In testimony that I claim the foregoing as my own I affix my signature in presence of two witnesses.

VIRGIL W. BLANCHARD.

Witnesses:
CHAS. R. CLARKE,
THOS. M. WYATT.